Figure 11:
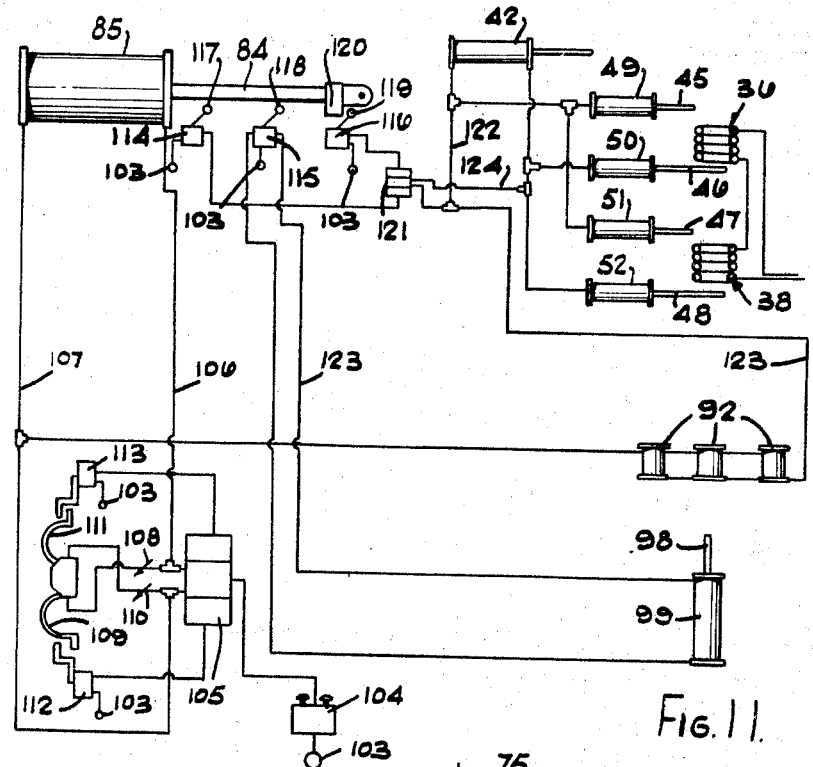

Feb. 18, 1969
P. H. EVANS 3,427,845
MANUFACTURE OF ELONGATED ARTICLES OF NONCIRCULAR
CROSS SECTIONAL SHAPE SUCH AS FOR
EXAMPLE TWIST DRILLS
Filed Jan. 15, 1964
Sheet 1 of 6
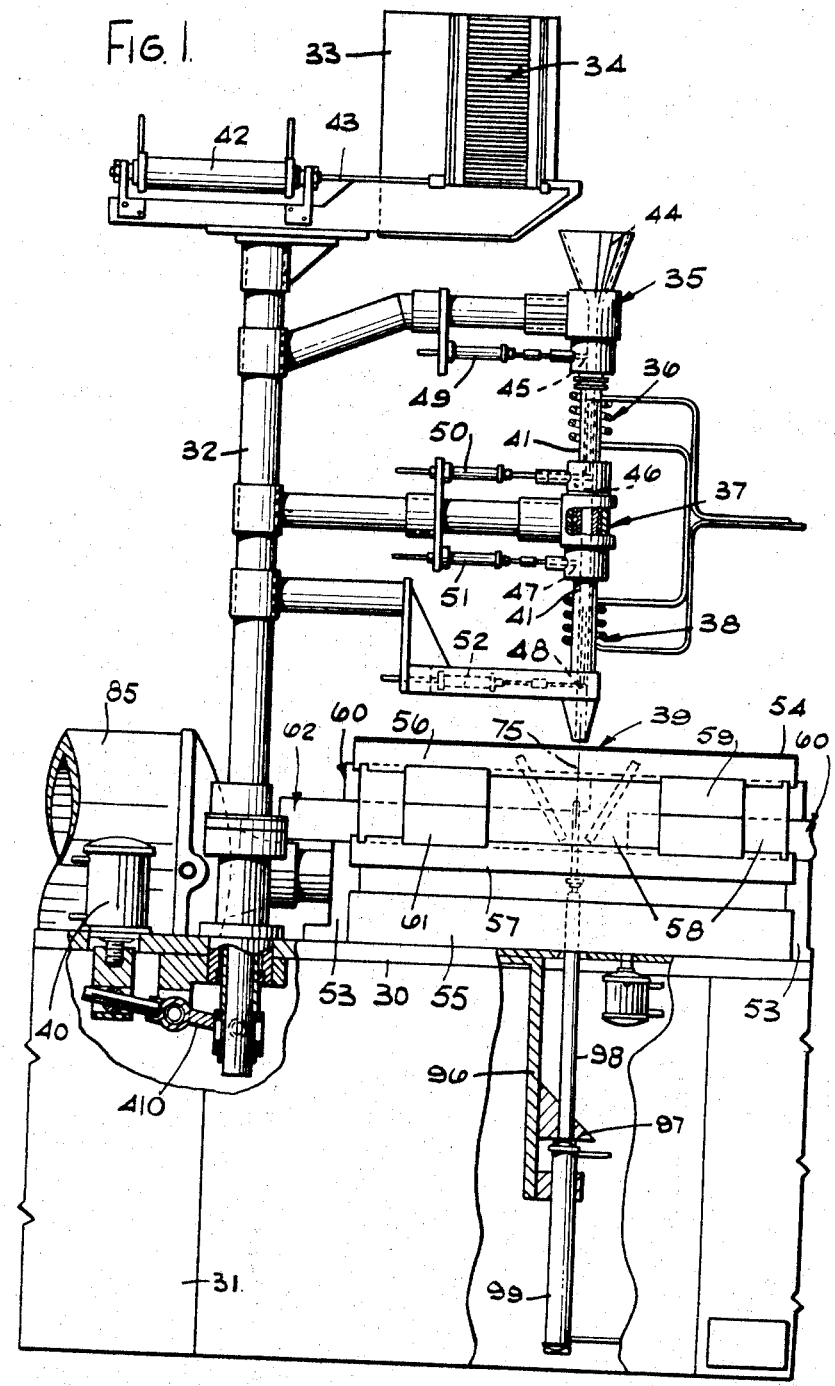
INVENTOR.
PHILIP HENRY EVANS

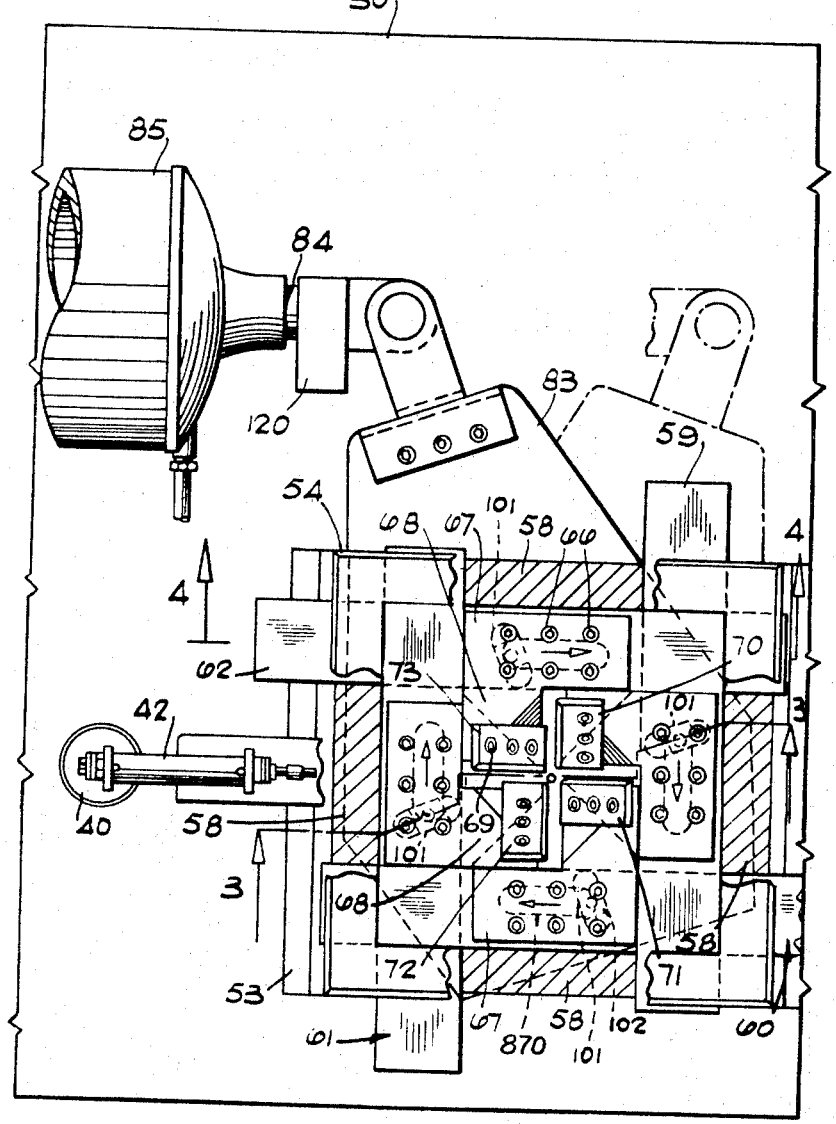

INVENTOR.
PHILIP HENRY EVANS

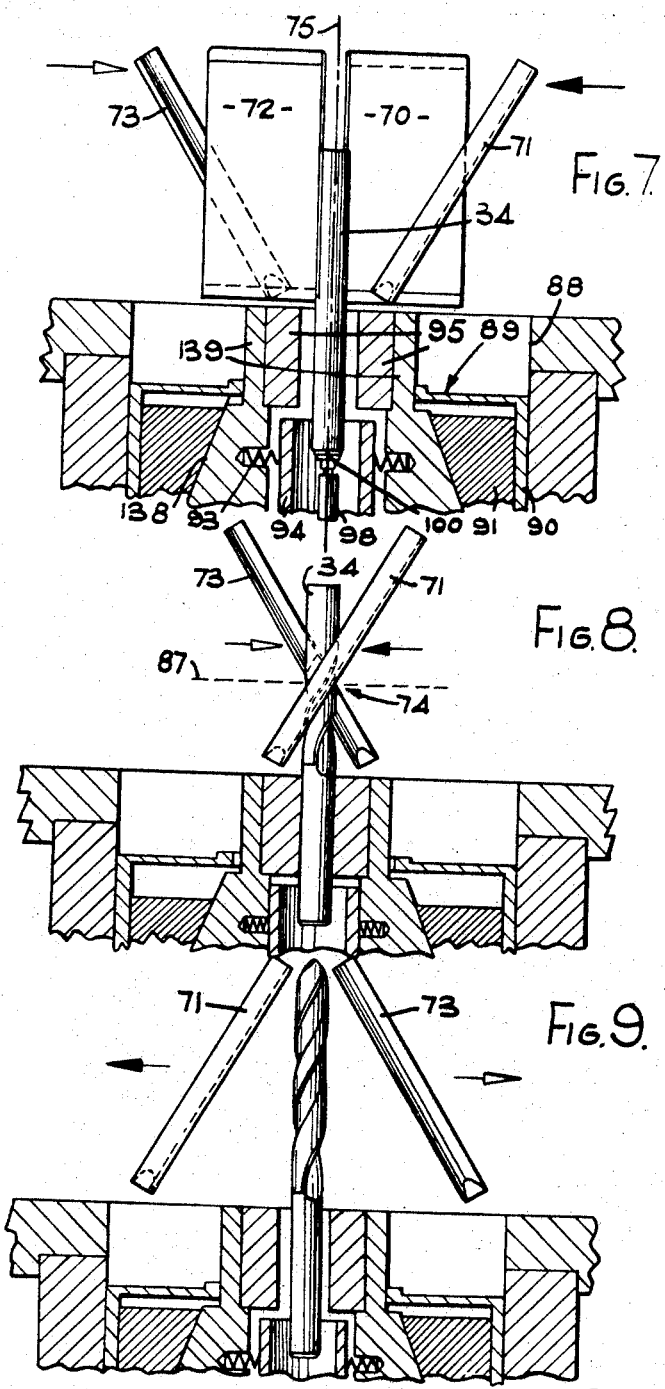

//  # United States Patent Office 3,427,845
Patented Feb. 18, 1969

3,427,845
MANUFACTURE OF ELONGATED ARTICLES OF NONCIRCULAR CROSS SECTIONAL SHAPE SUCH AS FOR EXAMPLE TWIST DRILLS
Philip Henry Evans, Pelsall, near Walsall, England, assignor, by mesne assignments, to Fred Fowler Limited, Old Hill, Stafford, England
Filed Jan. 15, 1964, Ser. No. 337,833
Claims priority, application Great Britain, Jan. 24, 1963, 2,966/63
U.S. Cl. 72—64
Int. Cl. B21d *11/14;* B21b *15/02;* B21k *5/02*
7 Claims This invention relates to the manufacture of elongated articles as rod-like articles of noncircular cross sectional shape and more particularly but not essentially the invention relates to the manufacture of fluted cutting tools such as twist drills.

Fluted cutting tools such as twist drills are at present made mainly by milling the clearance grooves in a blank which is approximately equal in length to the length of the finished tool but this is wasteful and slow. Fluted cutting tools are also made by passing a bar between profiled rollers which are positively driven to move the bar through the rollers whilst rolling the bar to the final shape but it is difficult to make larger diameter cutting tools such as, for example, tools of ½ inch or more in diameter in this way. Also it has been proposed to make fluted cutting tools by other rolling operations but these have not proved to be practical.

It is an object of the present invention to provide a machine for use in the manufacture of elongated rod-like articles such as twist drills which is capable of forming the articles to the required shapes quickly and irrespective of the cross sectional sizes of the articles.

It is a further object of the present invention to provide a machine for use in the manufacture of two-fluted twist drills which is capable of forming the twist drills to the required shapes quickly and irrespective of the cross sectional sizes of the twist drills.

Figure 3:
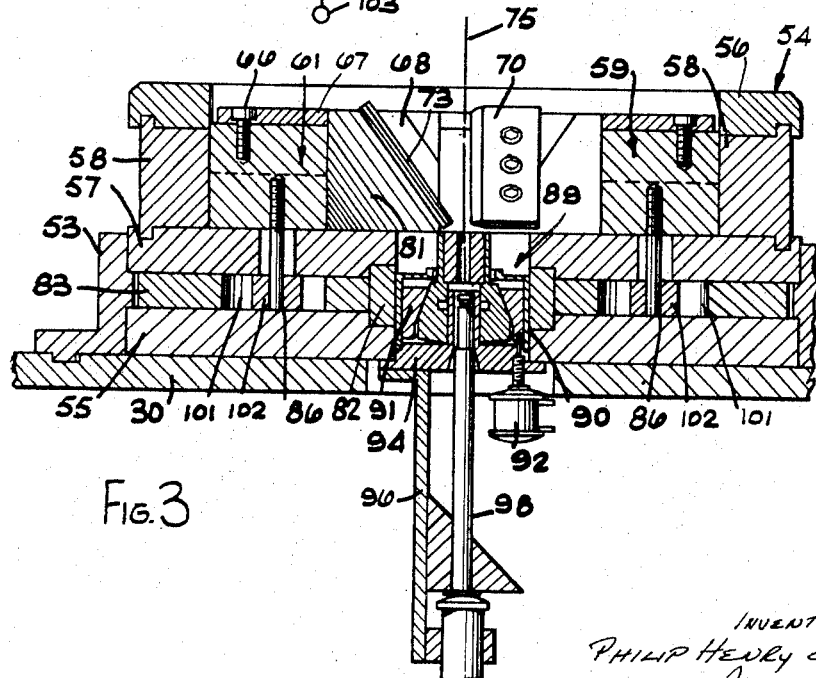
Figure 4:
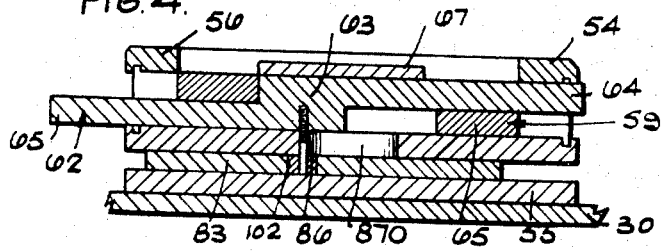
Figure 6:
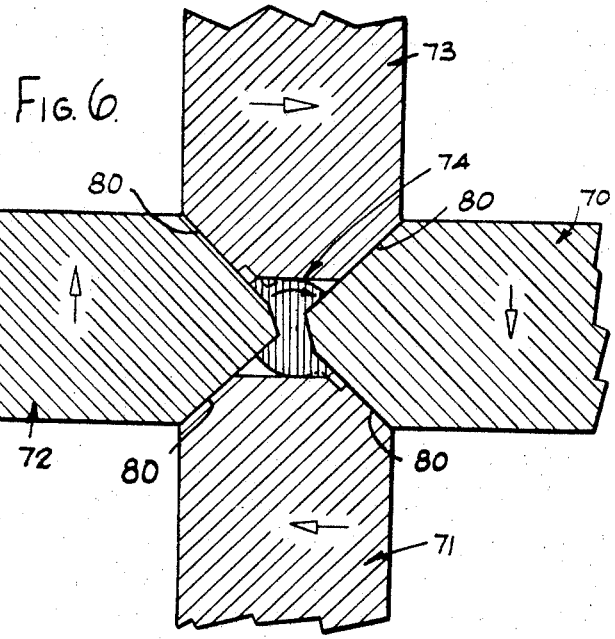
Figure 5:
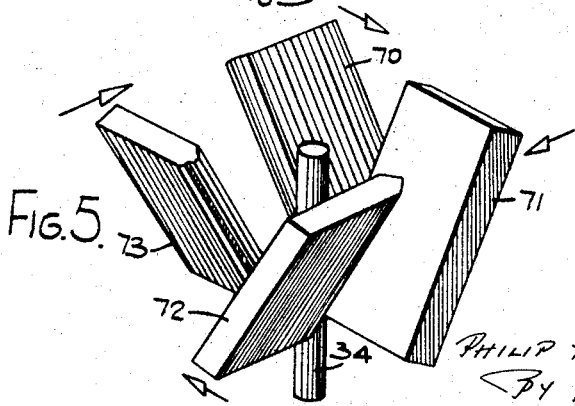

Machines will now be described with reference to the accompanying drawings for use in the manufacture of two fluted twist drills and straight fluted reamers and in the drawings:

FIGURE 1 is a fragmentary part sectional side view of an automatically operating machine used in the manufacture of two fluted twist drills, FIGURE 2 is a plan view of FIGURE 1 with parts removed for clarity, FIGURE 3 is a sectional view of FIGURE 2 on the lines 3—3 thereof and on an enlarged scale, FIGURE 4 is a sectional side view of FIGURE 2 on the lines 4—4 thereof and on an enlarged scale, FIGURE 5 is a perspective view showing the arrangement of dies used in the machine and an article blank to be formed by the dies, FIGURE 6 is a cross sectional view of the dies and an article blank therein on an enlarged scale, FIGURE 7 is a fragmentary sectional side view similar to FIGURE 3 showing the dies in an initial position relative to the article blank.

Figure 12:
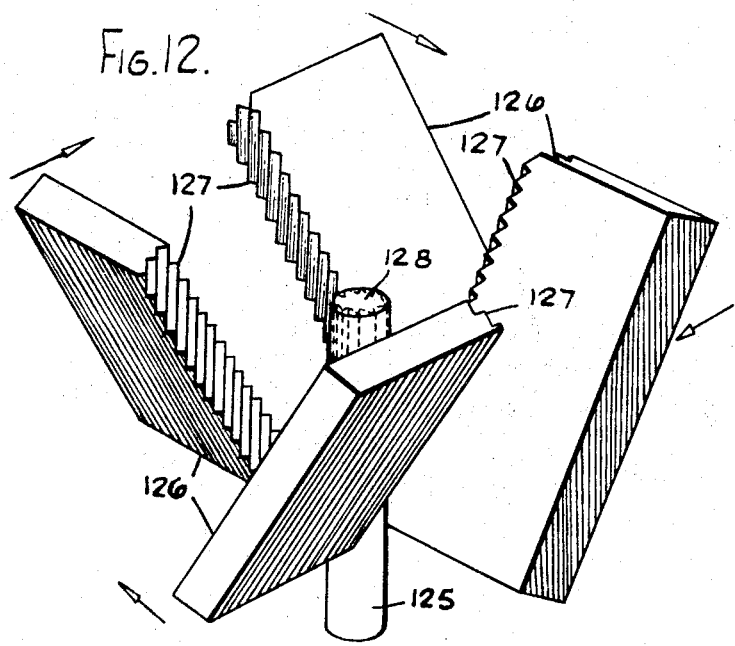
Figure 10:
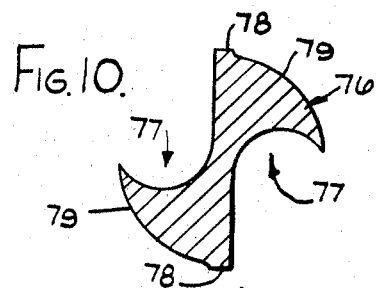

FIGURE 8 is a similar view to FIGURE 7 but with the dies advanced to an intermediate position, and with two of the dies removed for clarity, FIGURE 9 is a similar view to FIGURE 8 but with the dies advanced to a final position, FIGURE 10 is a cross sectional view of a two-fluted twist drill, FIGURE 11 is a diagrammatic layout of a pneumatic circuit whereby the machine can be operated continuously in an automatic manner, and FIGURE 12 is a view similar to FIGURE 5 but showing dies suitable for use in the manufacture of straight fluted reamers.

Referring to FIGURES 1 to 11 a horizontal bed 30 of the machine is mounted on a suitable leg structure 31 and supports a vertical post 32 at the upper end of which is supported a dispensing means or magazine 33 in which drill blanks 34 are housed in a vertical stack and said blanks are of cylindrical rod-like formation as shown in FIGURE 5 and are usually made of high speed steel and the length of each blank is approximately two-thirds the length of the finished two-fluted twist drill.

The blanks 34 are fed one-by-one into a vertically disposed tubular feed path generally indicated at 35 which includes a first heating station 36, a heat soaking station 37, and a second heating station 38 and after passing downwardly through the feed path 35 the blanks can enter a forging station 39 between four dies disposed above the bed 30 and in which forging station the blanks can be operated upon by the dies as shown in FIGURES 7 to 9 after which the blank can pass vertically downwardly out of the forging station 39 into a suitable collecting position (not shown).

The post 32 and the parts mounted thereon are arranged to be rotatable about the vertical axis of the post and said post can be lifted from the position shown in FIGURE 1 by operation of a pneumatic piston and cylinder device 40 through a pivoted lever 410 whereby the feed path can be moved sideways away from a position directly above the forging station 39 to enable maintenance work to be performed on the dies after which the feed path can be returned to a position vertically above the forging station.

At the heating stations 36 and 38 the heat is supplied by means of electric high frequency induction heating coils which surround silica-glass tubes 41 and which coils are connected to a suitable generator which, when the machine is operating, is permanently "on" so that immediately a drill blank enters a heating station said blank becomes heated.

The drill blanks 34 are dispensed from the magazine 33 one-by-one by means of a pneumatically operated horizontal piston and cylinder device 42 supported by the post 32 and the piston rod 43 of the device 42 operates to dispense or eject the lowermost drill blank 34 from the magazine into an upwardly divergent funnel 44 at the upper end of the tubular feed path.

Disposed above the first heating station 36 is a movable platform 45 and disposed below said heating station and above the heat soaking station 37 is a movable platform 46 and disposed below the heat soaking station and above the second heating station is a movable platform 47 and disposed below said station is a movable platform 48. The platforms 45, 46, 47 and 48 are provided by pistons or extensions thereof of horizontal pneumatically operated piston and cylinder devices 49, 50, 51 and 52 respectively, supported by the post 32.

The piston and cylinder devices 42 and 49 to 52 are controlled in such a manner that when the device 42 is contracted the devices 49 and 51 are also contracted and the devices 50 and 52 are extended so that the respective pistons 46 and 48 of the extended devices form stops whereby drill blanks 34 can be retained in the heating stations.

Similarly when the device 42 is extended the devices 49 and 51 are also extended so as respectively to support drill blanks before entering the first heating station and the heat soaking station, and the devices 50 and 52 are contracted. A pneumatically operated circuit for controlling the devices is described later with reference to FIGURE 11.

Secured to the bed 30 by means of angle plates 53 is a die body 54 which is square in plan view as shown in FIGURE 2 and includes a horizontal base plate 55, a horizontal top plate 56 and a horizontal intermediate plate 57 and the plates 56 and 57 are spaced apart by spacer blocks 58 positioned between the corners of the die body as shown in FIGURE 2.

Disposed between the top and intermediate plates 56 and 57 respectively are four slides 59, 60, 61 and 62 which are of elongated rectangular formation in plan view and are longer than the sides of the die body 54 as shown in FIGURE 2. The four slides are arranged to form the four sides of a square slide formation and each slide is mounted in the die body so as to be slidable rectilineally in a longitudinal direction and in a horizontal plane and the slides are guided by the top and intermediate plates 56 and 57 which are formed with rectangular grooves to receive the slides as shown in FIGURE 1 and by the spacer blocks 58.

Each slide when viewed in side elevation is of somewhat Z-shape as shown in FIGURE 4 so as to have a central part 63 of the full depth of the slide and to have at its opposite ends upper and lower slide plates 64 and 65 each equal in depth to half the depth of the central part 63 so that the lower horizontal face of the upper slide plate is co-planar with the upper horizontal face of the lower slide plate and the slides are of such a length as to overlap each other at and adjacent the corners of the square die body so as to have mutual sliding engagement with each other and to afford mutual support for each other. Thus the slides are adequately supported on all sides at least at their opposite ends both by the die body and by the mutual support which they afford each other so that under any load conditions imposed by the drill blank being operated upon the slides move smoothly.

Secured by screw means 66 to each of the slides 59 to 62 is a die carrying member 67 formed with a transverse die mounting 68 to which is secured by screw means 69 a die 70, 71, 72 or 73.

Each of the dies 70 to 73 is formed from a straight strip of steel bar of rectangular cross-sectional shape and the dies are disposed so that a longitudinal edge of each die forms part of a die nip indicated at 74 in FIGURE 6 and the longitudinal axis 75 of which nip is vertically disposed and is co-axial with the longitudinal axis of the feed path 35 when the latter is in an operative position.

The longitudinal edges of the dies which form the nip are each obliquely inclined to the longitudinal axis of the nip along four skew lines in such a manner that the required helix angle will be obtained in the finished twist drill when taking into consideration that due to lengthening of the drill blank occurring during the operation of the dies, as referred to later, it is found in practice that if in the twist drill a helix angle of 30° to the longitudinal axis of the twist drill is required, the longitudinal edges of the dies would have to be inclined at an angle of approximately 35° to said axis of the nip.

The longitudinal edges of the two opposite dies 70 and 72 are shaped so as to provide flute forming dies and the longitudinal edges of the other two opposite dies 71 and 73 are shaped so as to provide land and backing forming dies and these parts of a drill will be recognized from FIGURE 10 which shows a twist drill 76 formed with two opposite flutes 77, two opposite lands 78 and two backings 79.

The dies are formed with beveled edges indicated at 80 which have an easy sliding fit engagement with each other so that the nip 74 formed by the four dies is a complete enclosure.

The four dies are arranged so that their beveled edges combine to form the nip 74 and each of the dies intersects a common horizontal plane 87 of the nip and said dies move translationally parallel with said plane in respective directions tangential relative to circles about the longitudinal axis of a drill blank 34 contained in the nip so that said drill blank is caused to rotate about its own axis by the movement of the dies in respective intersecting paths.

It will be appreciated from FIGURE 2 that the dies move simultaneously in a clockwise manner as indicated by the arrows in FIGURE 5 or in an anti-clockwise manner about the longitudinal axis 75 of the nip and that during the clockwise movement the lower ends of the four dies move beyond and underneath each other and to enable this to take place the transverse die mountings 68 are cut away at 81 (see FIGURE 3). As the dies are indirectly mounted on the slides between the ends thereof the dies themselves are adequately supported and are prevented from vibrating during operation on a drill blank.

Located between the horizontal base plate 55 and the horizontal intermediate plate 57 is a cylindrical bush 82 disposed co-axial with the vertical longitudinal axis 75 of the nip and mounted on the bush and disposed between the two plates is a common oscillatable member 83 which is connected to a piston rod 84 of a pneumatically operated piston and cylinder device 85 of which the end of the cylinder remote from the member 83 is pivotally mounted (not shown) on the bed 30 so as to be capable of making oscillatory movements about a vertical axis.

Formed in the oscillatable member 83 are four radial slots 101 engaged by slide blocks 102 in each of which is mounted a coupling pin 86 also secured at its upper end to one of the slides 59 to 62 and said coupling pins pass through clearance holes 870 in the horizontal intermediate plate 57. By this means when the device 85 is operated to cause oscillation of the member 83, the dies 70 to 73 are moved simultaneously in a rectilineal manner in a horizontal plane to cause the die nip to move along the longitudinal axis 75 of the nip.

Some of the positions assumed by the dies 70 to 73 are illustrated in FIGURES 7 to 9 in which in FIGURE 7 the dies are in an extreme open position and in this position the device 85 is in a contracted position as shown in FIGURE 2 and when the device 85 is extended the dies move gradually towards the position shown in FIGURE 8 so that the nip 74 is moved vertically upwardly along the longitudinal axis of the nip so that the horizontal plane 87 of the nip is advanced upwardly along the drill blank 34 and continued movement of the dies results in said dies assuming a final position as shown in FIGURE 9 in which they have moved beyond the drill blank to release same and in which position the device 85 is in a fully extended position.

Secured in a common bore 88 of the plates 55 and 57 and the bush 82 is a chuck 89 comprising a stationary cylindrical case 90 and a ring 91 formed with an inclined bore 138 and the ring is movable upwardly and downwardly by three pneumatically operated piston and cylinder devices 92 only one of which is shown in FIGURES 1 and 3 and of which the pistons are connected to the ring 91 and are spaced equi-angularly around the ring.

Disposed within the ring 91 are three segmental jaws 139 each extending over an angle of 120° and lower body parts of the jaws are inclined in a complementary manner to the ring 91 and are urged radially apart by compression springs 93 operating between the jaws and a stationary tubular mounting member 94 to which the devices 92 are secured.

The upper parts of the jaws 139 are each provided with a sleeve portion 95 and the three sleeve portions provided combine to provide a support for the lower part of a drill blank 34 such that when the chuck is contracted to a maximum extent and which is achieved by moving the ring 91 downwardly, the sleeve formed by the portions 95 can support a drill blank while allowing it to turn. The upper end of the sleeve is closely adjacent the lower ends of the dies 70 to 73.

Secured to the member 94 is a depending bracket 96 provided with an inclined drill blank deflector 97 through which passes the piston rod 98 of a pneumatically operated piston and cylinder device 99 and the upper end of the piston rod forms a platform 100 which in its highest position is disposed slightly below the sleeve segments 95 as shown in FIGURES 3 and 7 for holding a blank 34 in a fixed axial position.

The devices 85, 92 and 99 are connected in the pneumatic circuit with the other previously mentioned pneumatically operated devices as will be described later with reference to FIGURE 11.

The operation of the machine is as follows from a condition assuming that the dies 70 to 73 are in their fully open positions as shown in FIGURE 7 and that a drill blank is resting on the platform 48 and is receiving a second stake heating and that a drill blank is resting on the platform 46 and is receiving a first stage heating and the platform 100 is disposed in its uppermost position as shown in FIGURE 7. The dies remain fully open for a short period or dwell whereupon the two platforms 45 and 47 are advanced into the feed path and the two platforms 46 and 48 are withdrawn from the feed path so that the heated blank from the first heating station falls into the soaking station 47 to permit the heat to pass from the skin to the interior of the drill blank and the drill blank which has been finally heated in the second heating station falls gravitationally into the sleeve 95 which is in an open condition and the lower end of the drill blank rests on the platform 100 and simultaneously a drill blank is fed out of the magazine 33 by the device 42 to rest on the platform 45. The chuck 89 is then operated so that the sleeve 95 contracts to centralise the lower shank part of the drill blank whilst however allowing the drill blank to rotate about its vertical axis and the dies 70 to 73 advance to grip the drill blank at their lower ends at which they define a completely enclosed nip 74 and continued movement of the dies results in the drill blank being formed to the required cross sectional shape of a two-fluted drill by an advancing nip which moves upwardly along the vertical longitudinal axis 75 of the drill blank and during this movement of the dies the drill blank is rotated about its longitudinal vertical axis and because metal of the drill blank is displaced as a result of the flutes 77 being formed therein the drill blank is lengthened vertically upwardly so that the upper end of the drill blank becomes almost level with the upper ends of the dies and in this condition a fluted portion of the required length is formed on the drill blank without wastage of the metal of which the drill blank is formed.

At an instant whilst the dies are operating on the drill blank the platform 100 is moved vertically downwardly into a fully retracted position and the chuck 89 operates to cause the sleeve 95 to open so that the drill blank is supported axially and transversely solely by the dies and when the dies move into their final positions as shown in FIGURE 9 in which they have moved beyond and have released the drill blank, the drill blank is allowed to fall downwardly and strikes the deflector 97 from which it is directed to a collecting means for cooling and subsequent treatment.

After the drill blank has fallen out of the dies, the dies dwell or pause in this condition to ensure that the drill blank is clear of the dies and thereafter said dies are returned into an initial position as shown in FIGURE 7 preparatory to receiving a further drill blank to be operated upon and this initial position of the dies is maintained for a short period or dwell to enable the further blank to enter the open sleeve 95 and rest on the now elevated platform 100.

In order that the machine can work continuously in an automatic manner the various pneumatically operated devices are connected in a circuit as shown in FIGURE 11 but it should be appreciated that small refinements may be found to be advantageous in practice.

A main pneumatic supply is indicated at 103 and this is connected to a control on-off switch 104 which is connected to a known type of four-way automatic valve 105 of which a first side is connected by a line 106 to one end of the device 85 while the other or second side of the valve is connected by a line 107 to the other end of the device 85 so that said device 85 will be operated according to which side of the valve 105 is opened, it being appreciated that only one side can be open at any instant.

In order that the device 85 can be operated continuously the line 106 is also connected through a known type of adjustable fine flow valve 108 to a Bourdon tube 109 and the line 107 is connected through a further adjustable fine flow valve 110 to a Bourdon tube 111. The free end of the Bourdon tube 109 is adapted to co-operate across a gap, with a known micro-pilot valve 112 and the other free end of the Bourdon tube 111 is adapted to co-operate, across a gap, with a known micro-pilot valve 113 and both of the micro-pilot valves are connected to the pneumatic supply source 103 and the valve 112 is connected to the second side of the valve 105 and the other valve 113 is connected to the second side of the valve 105. By this arrangement when one side of the valve 105 is open to supply pressure to one end of the device 85 pressure is also supplied through the appropriate fine flow valve to the appropriate Bourdon tube whereby the associated micro-pilot valve is operated to supply pressure to the valve 105 to cause said valve 105 to change over so that the other side of the valve 105 is opened and pneumatic pressure is supplied to the other end of the device 85 whereupon the appropriate Bourdon tube operates its associated micro-pilot valve and the four-way automatic valve 105 continues to be operated so that its two sides are opened and closed alternately.

The adjustable fine flow valves 108 and 110 can be adjusted and set to enable a predetermined time delay or dwell to occur at each end of the stroke of the piston rod 84 of the device 85 and this time delay or dwell is employed as previously described to enable the drill blanks to freely enter and leave the dies.

Screw means may be provided between the free ends of the Bourdon tubes and the micro-pilot valves to enable the effective positions of the free ends of the Bourdon tubes or the sizes of the gaps previously referred to to be adjusted.

Positioned adjacent the piston rod 84 are two known pilot valves 114 and 116 and a known two-way valve 115, each connected to a pneumatic supply 103 and having respective lever operating means 117, 118 and 119 adapted to be moved onto two opposite sides of central vertical axes by a piston rod actuator 120 secured to the piston rod 84 during movement between the fully extended position as shown in FIGURE 11 and the fully contracted position of the device as shown in FIGURE 2.

The pilot valve 114 is connected to a first side of a known four-way automatic valve 121 and which first side is also connected by a line 122 to the rear end of the device 42 and with the rear ends of the devices 49 and 51 which provide platforms 45 and 47 to enable the drill blanks to enter the heating stations 36 and 38 respectively and is also connected by a line 123 with the rear ends of the three devices 92 associated with the chuck 89. The pilot valve 116 is associated with the other or second side of the four-way automatic valve 121 and which other side is also connected by a line 124 with the forward end of the device 42 and with the rear ends of the two devices 50 and 52 which provide platforms 46 and 48 for releasing the heated drill blanks from the heating stations 36 and 38 respectively.

The four piston and cylinder devices 49 to 52 are such that the pistons thereof are urged into their extended positions by pneumatic pressure and are spring-urged in the return direction.

The two pilot valves 114 and 116 are disposed adjacent the extreme end position of the piston rod actuator 120 and the two-way valve 115 is disposed intermediate these extreme positions and this two-way valve 118 is connected on one side to one end of the device 99 which is associated with the platform 100 for initially supporting the drill blanks in the chuck and the other side of the two-way valve is connected to the other end of said device 99.

It should be appreciated that the pneumatic circuit illustrated in FIGURE 11 enables the machine to operate continuously in an automatic manner to dispense drill blanks 34 from the magazine into the vertical feed path and through the heating and soaking stations therein and into a position between the dies which are caused to operate to form the upper part of the drill blank to the required helical formation and to release the formed drill blank to allow it to pass downwardly through the dies to a collecting means.

Referring now to FIGURE 12 this shows a vertically disposed reamer blank 125 to be operated upon by four inclined dies 126, which are movable in the direction of the arrows and the dies 126 are formed on their edges which combine to form a nip with vertically disposed tooth formations 127 shaped to form straight i.e. not helical teeth and thus flutes in the reamer blank and which straight teeth and flutes are indicated in dotted lines at 128.

After the drill blanks have been formed in any of the dies previously described the formed blanks are subjected to the required heat treatment and to centreless grinding operations and the fluted end of the drill is ground to the required cutting angles to form a final drill.

Machines constructed in accordance with the present invention afford the following advantages over known machines.

(A) The dies and the means by which they are movably mounted enable a very sturdy and robust construction to be obtained such that for example two-fluted twist drills can be manufactured in a range from the smallest diametral sizes to sizes including and over ½″ in diameter and which latter size is the largest size which can be satisfactorily made by known rolling methods.

(B) The dies are of simple formation and, more particularly the straight dies described with reference to FIGURES 1 to 11, can be initially machined and finally ground to the required form by simple reciprocatory shaping or grinding operations so that the dies can be easily maintained in efficient working condition.

(C) As the dies which operate on the heated blanks are in direct thermal contact with the die mountings and the slides and as these mountings and slides have a relatively large mass, the heat absorbed by the dies is quickly conducted to the die mountings and slides which are capable of absorbing this heat without any substantial rise in temperature, so that the dies do not become overheated after working continuously for long periods and there is thus no need to make special arrangements for cooling the dies during or between the actual rolling operation on the blanks.

What I claim then is:
1. An apparatus for shaping elongated blanks comprising, in combination:
(a) holding means for holding one of said blanks in a longitudinally secured position while permitting rotation of said blank about an axis extending in the direction of elongation thereof;
(b) a plurality of die members having respective edge portions obliquely inclined relative to said axis; and
(c) moving means for simultaneously moving said die members in respective paths transverse of said axis,
  (1) each path being tangential to a circle about said axis and intersecting the respective paths of two other die members,
  (2) said edge portions of said die members jointly defining a nip about said axis during a portion of the simultaneous movement thereof, said nip being substantially closed in a plane perpendicular to said axis, and
  (3) the inclination of said edge portions relative to said axis and the direction of simultaneous movement of said die members being such that said plane moves in the direction of said axis during said simultaneous movement of said die members.

2. An apparatus as set forth in claim 1, wherein said edge portions are elongated along respective skew lines.

3. An apparatus as set forth in claim 1, wherein said moving means include means for reciprocating said die members in said paths thereof in translational movement.

4. An apparatus as set forth in claim 1, further comprising feeding means for consecutively feeding a plurality of said blanks to said holding means; release means for consecutively releasing blanks shaped by said die members from said holding means; and control means operatively connected to said feeding means, said holding means, and said moving means for operating the same in timed sequence.

5. A method of shaping an elongated blank which comprises:
(a) sequentially enclosing longitudinally consecutive portions of said blank between a plurality of shaping dies,
  (1) said blank having a longitudinal axis, and said dies defining a substantially closed nip about each enclosed portion of the blank and shapingly engaging said portion along said nip; and
(b) simultaneously moving said dies in respective intersecting paths transverse of said axis while the dies engage said portions of the blank, the dies being moved in the respective paths in the same angular direction relative to said axis.

6. A method as set forth in claim 5, wherein said paths are substantially rectilinear.

7. A method as set forth in claim 6, wherein said paths extend in a common plane substantially perpendicular to said axis.

References Cited

UNITED STATES PATENTS

| 2,985,041 | 5/1961 | Hayden | 72—64 |
| 3,222,908 | 12/1965 | Molella | 72—64 |

FOREIGN PATENTS 651,973  1/1951  Great Britain.

RICHARD J. HERBST, *Primary Examiner.*